United States Patent
Morita et al.

(10) Patent No.: US 10,437,226 B2
(45) Date of Patent: Oct. 8, 2019

(54) POSITIONING CONTROL APPARATUS

(71) Applicant: Mitsubishi Electric Corporation, Tokyo (JP)

(72) Inventors: Shogo Morita, Tokyo (JP); Hidehito Kato, Tokyo (JP); Keiji Suematsu, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 133 days.

(21) Appl. No.: 15/548,479

(22) PCT Filed: Apr. 23, 2015

(86) PCT No.: PCT/JP2015/062438
§ 371 (c)(1),
(2) Date: Aug. 3, 2017

(87) PCT Pub. No.: WO2016/170660
PCT Pub. Date: Oct. 27, 2016

(65) Prior Publication Data
US 2018/0024526 A1 Jan. 25, 2018

(51) Int. Cl.
*G05B 19/404* (2006.01)
*G05B 19/409* (2006.01)
(52) U.S. Cl.
CPC .......... *G05B 19/404* (2013.01); *G05B 19/409* (2013.01); *G05B 2219/34435* (2013.01)
(58) Field of Classification Search
CPC .............. G05B 19/404; G05B 19/409; G05B 2219/34435
See application file for complete search history.

(56) References Cited

U.S. PATENT DOCUMENTS

2011/0270424 A1* 11/2011 Nakai .................. G06F 11/3604
700/87
2011/0301719 A1 12/2011 Kuroda
(Continued)

FOREIGN PATENT DOCUMENTS

CN 103246267 A 8/2013
JP 3358759 B2 12/2002
(Continued)

OTHER PUBLICATIONS

Notice of Rejection of JP App. No. 2016-514190 dated Aug. 4, 2016.
(Continued)

*Primary Examiner* — Christopher E. Everett
(74) *Attorney, Agent, or Firm* — Sughrue Mion, PLLC; Richard C. Turner

(57) ABSTRACT

The positioning control apparatus that controls driving of a motor while displaying an operation screen of a motion control program includes a software development support unit to create and output a probe list for control signals or devices used in the motion control program included in the software development support unit; and a sampling display unit to output the probe list to the controller and to display data sampled in the controller. The software development support unit creates the probe list for at least one control signal or at least one device in accordance with an operation performed on the operation screen of the motion control program.

4 Claims, 5 Drawing Sheets

(56) References Cited

U.S. PATENT DOCUMENTS

| | | |
|---|---|---|
| 2011/0313546 A1 | 12/2011 | Ikegaya et al. |
| 2012/0303853 A1* | 11/2012 | Brux .................. G05B 19/0426 710/305 |
| 2013/0304242 A1 | 11/2013 | Nagumo et al. |
| 2014/0306642 A1 | 10/2014 | Kaku et al. |
| 2015/0112460 A1* | 4/2015 | Sakaguchi ........... G05B 19/056 700/87 |
| 2015/0227348 A1 | 8/2015 | Fuchikami et al. |
| 2016/0170397 A1* | 6/2016 | Takehisa ................ G05B 19/05 700/83 |

FOREIGN PATENT DOCUMENTS

| | | |
|---|---|---|
| JP | 3394416 B2 | 4/2003 |
| JP | 2004-265441 A | 9/2004 |
| JP | 2005-044109 A | 2/2005 |
| JP | 2007-034547 A | 2/2007 |
| JP | 2008-293138 A | 12/2008 |
| JP | 2009-265918 A | 11/2009 |
| JP | 2012-003681 A | 1/2012 |
| JP | 2013-003715 A | 1/2013 |
| KR | 101280083 A | 6/2013 |
| WO | 2010/134198 A1 | 11/2010 |
| WO | 2012/104959 A1 | 8/2012 |
| WO | 2013/099031 A1 | 7/2013 |
| WO | 2014064830 A1 | 5/2014 |

OTHER PUBLICATIONS

International Search Report of PCT/JP2015/062438 dated Jul. 21, 2015 [PCT/ISA/210].

Notification of Reason for Refusal dated Jan. 22, 2019 from the Korean Intellectual Property Office in application No. 10-2017-7022625.

Communication dated Feb. 22, 2019, from State Intellectual Property Office of the P.R.C. in counterpart application No. 201580076291.5.

Communication dated Jul. 26, 2019, by the Korean Intellectual Property Office in application No. 10-2017-7022625.

\* cited by examiner

FIG.7

AIM-SPECIFIC LIST REGISTRATION  ☒

LIST NAME: ASCERTAIN BEHAVIOR OF LONGITUDINAL AXIS AT START

| ITEM | Device | Size | |
|---|---|---|---|
| ☑ AXIS1-START ACCEPT FLAG | M2001 | | |
| ☑ AXIS1-POSITIONING START COMPLETION | M2400 | | |
| ☑ AXIS1-IN-POSITION | M2402 | | |
| ☑ AXIS1-SPECIFIED IN-POSITION | M2403 | | |
| ☑ AXIS1-SPECIFIED SPEED | #8004 | 4(±) | |
| ☑ AXIS1-MOTOR ROTATION SPEED | #8002 | 4(±) | |
| ☑ AXIS1-FEED CURRENT PLACE | D 0 | 4(±) | |
| ☑ FREE RUN TIMER | FT | 4(±) | |
| ☑ AXIS32-START ACCEPT FLAG | M2032 | | |
| ☑ AXIS32-POSITIONING START COMPLETION | M3020 | | |
| ☑ AXIS32-IN-POSITION | M3022 | | |
| ☑ AXISI-SPECIFIED IN-POSITION | M3023 | | |

REGISTER IN DIGITAL OSCILLO | OK | CANCEL

POSITIONING CONTROL APPARATUS

CROSS REFERENCE TO RELATED APPLICATIONS

This application is a National Stage of International Application No. PCT/JP2015/062438, filed Apr. 23, 2015, the contents of which are incorporated herein by reference in its entirety.

FIELD

The present invention relates to a positioning control apparatus that controls driving of a motor.

BACKGROUND

A motion SFC (Sequential Function Chart) programming language is used in order to perform motion control by a positioning control apparatus. The positioning control apparatus can be exemplified by a servo system controller. An example of such a motion SFC program is disclosed in Patent Literature 1. This motion SFC programming language is an SFC created exclusively for motion controllers and is written by combining symbols with which a program is written. In the symbols with which a program is written, signals or devices to control motions are recorded, and the motion control is performed by changing these signals or devices. There are motion SFC programming tools, which are engineering tools used to create such programs. The motion SFC programming tool is also called a software development support apparatus.

Further, when ascertaining or verifying the operations of such a program, an engineering tool called a digital oscilloscope tool is used by which, for control signals or devices used in the program, data is sampled at constant intervals and is graphically displayed in a time sequence on a screen. The digital oscilloscope tool is also called a sampling display apparatus.

CITATION LIST

Patent Literature

Patent Literature 1: International Publication No. 2012/104959

SUMMARY

Technical Problem

However, when control signals or devices to be sampled by this sampling display apparatus are registered in two different engineering tools, setting needs to be performed individually for each of the control signals or devices on the operation screen of the sampling display apparatus while referring to the operation screen of the software development support apparatus. Thus, during the setting, both of these screens have to be referred to and thus the setting operation is unnecessarily complicated. Therefore, there is a problem in that, when multiple control signals or devices exist, the amount of labor required is particularly large.

The present invention is made in view of the above, and an object of the present invention is to provide a positioning control apparatus by which control signals or devices to be sampled can be registered through a simple operation performed on the operation screen of a motion control program.

Solution to Problem

In order to solve the above problems and achieve the object, an aspect of the present invention is a positioning control apparatus that controls driving of a motor while displaying an operation screen of a motion control program. The positioning control apparatus includes a software development support unit to create and output a probe list for a control signal or a device used in the motion control program included in the software development support unit; and a sampling display unit to output the probe list to a controller and to display data sampled in the controller. The software development support unit creates the probe list for at least one control signal or at least one device in accordance with an operation performed on the operation screen of the motion control program.

Advantageous Effects of Invention

The positioning control apparatus according to the present invention produces an effect where it is possible to provide a positioning control apparatus by which control signals or devices to be sampled can be registered through a simple operation performed on the operation screen of a motion control program.

BRIEF DESCRIPTION OF DRAWINGS

FIG. 7 is a diagram illustrating an example of an operation screen of "Aim-specific list registration" in the fifth embodiment.

DESCRIPTION OF EMBODIMENTS

A positioning control apparatus according to embodiments of the present invention will be described in detail below with reference to the drawings. Note that these embodiments are not intended to limit the present invention.

First Embodiment

Figure 1:
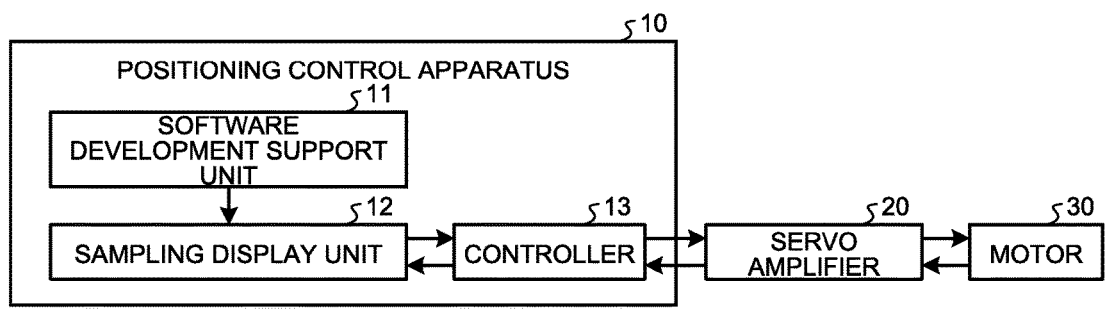
FIG. 1 is a block diagram illustrating an example configuration of a positioning control apparatus according to a first embodiment.

FIG. 1 is a block diagram illustrating an example configuration of a positioning control apparatus according to a first embodiment of the present invention. A positioning control apparatus 10 illustrated in FIG. 1 is a positioning control apparatus that controls the driving of a motor 30 by a motion control program while displaying the operation screen of the motion control program. The positioning control apparatus 10 includes a software development support unit (software development supporter) 11 that includes the motion control program and creates and outputs a probe list; a sampling display unit (sampling display) 12 that outputs the probe list to a controller and displays data sampled by the controller; and a controller 13 that executes the motion control program and samples data in accordance with the input probe list. The software development support unit 11 can be exemplified by a motion control program development support apparatus. The sampling display unit 12 can be exemplified by a digital oscilloscope tool. Although FIG. 1 illustrates only a servo amplifier 20 and the motor 30, the present invention is not limited to this and multiple servo amplifiers and multiple motors connected to the servo amplifiers may be connected to the positioning control apparatus 10.

Note that the probe refers to information for identifying an object to be sampled, and examples of such information include a control signal name and an axis number or a device name. The probe list refers to an information group that is included in the sampling display unit and in which one or a plurality of probes are listed.

Figure 2:
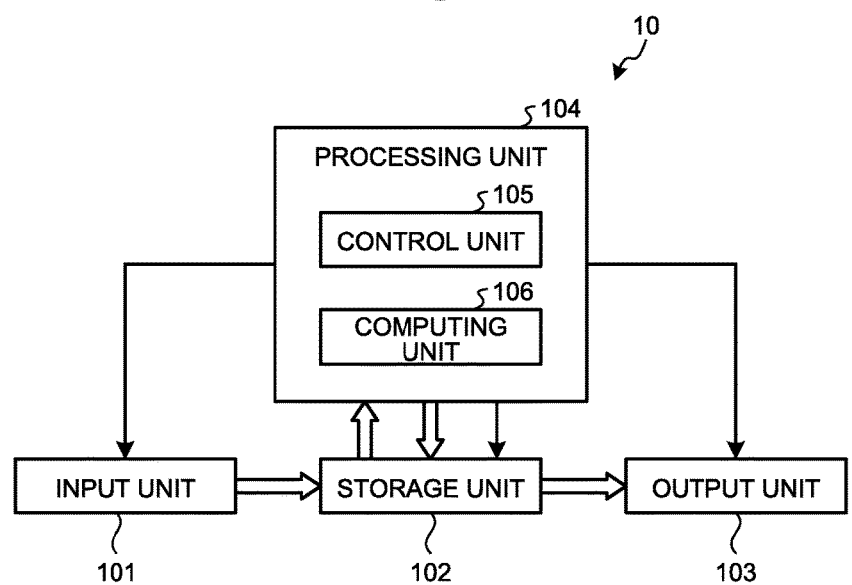
FIG. 2 is a block diagram illustrating an example of a hardware configuration that implements the positioning control apparatus according to the first embodiment.

FIG. 2 is a block diagram illustrating an example of a hardware configuration that implements the positioning control apparatus 10. The positioning control apparatus 10 illustrated in FIG. 2 includes an input unit 101 that is an interface to which data is input by an operation performed by the user; a storage unit 102 that stores data output from the input unit 101; an output unit 103 that is an interface that outputs data stored in the storage unit 102; and a processing unit 104 that inputs and reads data to and from the storage unit 102 and that controls the input unit 101, the storage unit 102, and the output unit 103. The processing unit 104 includes a controlling unit 105 that controls the units; and a computing unit 106 that performs computing.

The input unit 101 can be exemplified by a mouse that is a pointing device and a keyboard. The storage unit 102 includes a main storage unit and an auxiliary storage unit. The output unit 103 can be exemplified by a display device.

In the present embodiment, a software development support program stored in the storage unit 102 implements the software development support unit 11 and a sampling display program stored in the storage unit 102 implements the sampling display unit 12.

Figure 3:
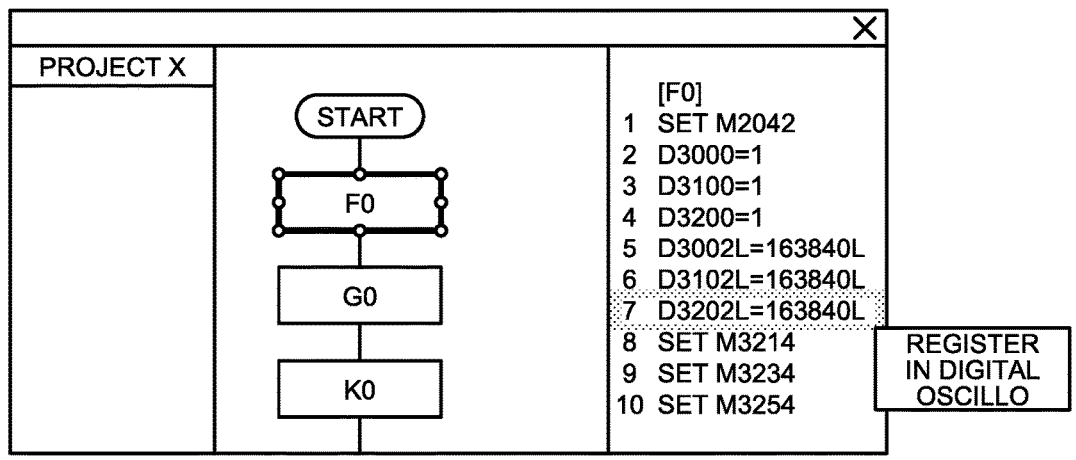
FIG. 3 is a diagram illustrating an example of an operation screen of a software development support unit in the first embodiment, the screen being displayed on a display device that is an output unit.

FIG. 3 is a diagram illustrating an example of the operation screen of the software development support unit 11, the screen being displayed on the display device that is the output unit 103. In the operation screen illustrated in FIG. 3, symbols F0, G0, K0 are displayed in the middle. The symbols F0, G0, K0 denote a plurality of programs that belong to the selected project. Here the symbol F0 denoting a program is selected. The details of the selected symbol F0 denoting a program are displayed on the right side of the operation screen, and here "7 D3202L=163840L" is selected. Here, typically, by right-clicking with a mouse, i.e., the input unit 101, on the selected "7 D3202L=163840L", the menu of "7 D3202L=163840L" is displayed. Here, as the menu of "7 D3202L=163840L", only the operation of "Register in digital oscilloscope" is displayed. When the user selects "Register in digital oscilloscope", the software development support unit 11 creates a probe list for the device "D3202" in order to output the probe list to the sampling display unit 12.

The probe list may be created by the software development support unit 11 adding a probe to the already-existing probe list that is stored in the memory of the sampling display unit 12. Alternatively, if no probe list exists, the probe list may be automatically created. Alternatively, as described in a later embodiment, the probe list may be created by reading data that has been processed by another terminal so as to be distributable.

Figure 4:
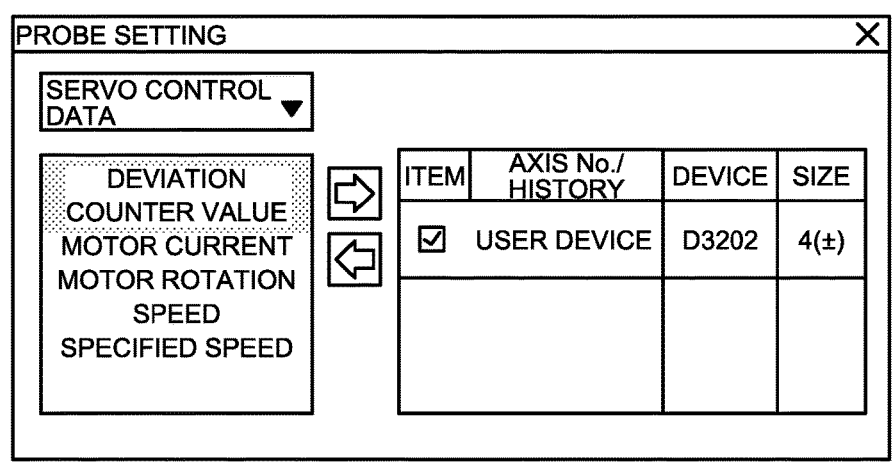
FIG. 4 is a diagram illustrating an example of an operation screen of a sampling display unit in the first embodiment, the screen being displayed on the display device that is the output unit.

FIG. 4 is a diagram illustrating an example of the operation screen of the sampling display unit 12, the screen being displayed on the display device that is the output unit 103. FIG. 4 is an operation screen for setting probes, and when "Deviation counter value" is selected from "Servo control data" on the operation screen for setting probes, it is indicated that the probe list for the user device "D3202" is automatically registered.

Figure 5:
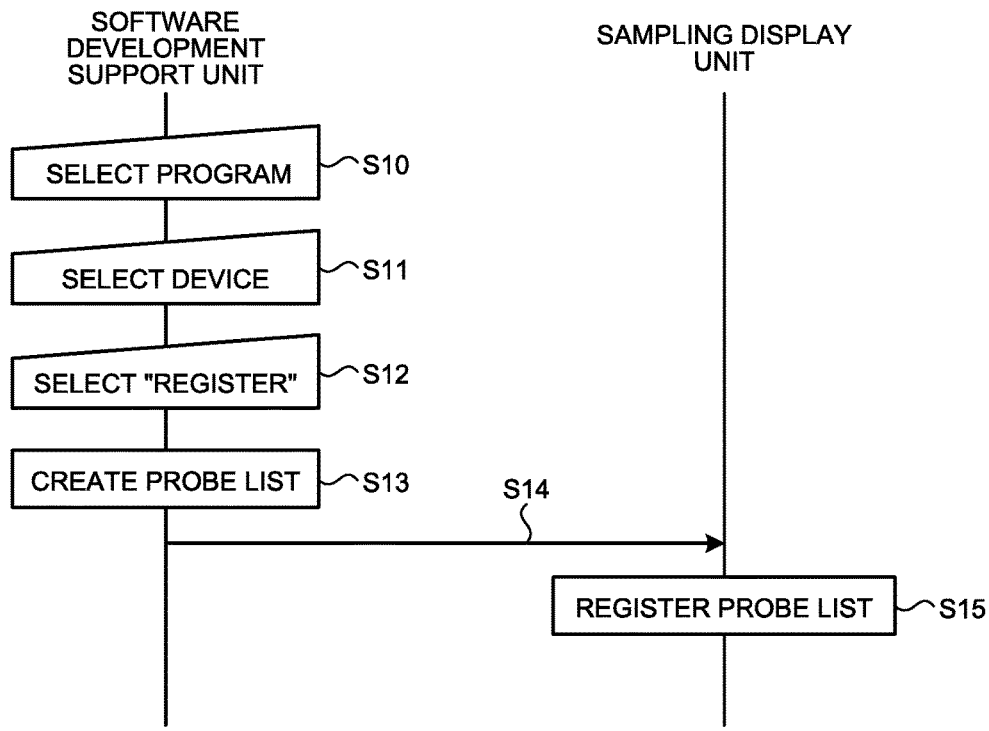
FIG. 5 is a sequence diagram illustrating the operation of the software development support unit and the sampling display unit in the first embodiment.

FIG. 5 is a sequence diagram illustrating the operation of the software development support unit 11 and the sampling display unit 12 in the present embodiment. In the sequence diagram illustrated in FIG. 5, the user selects a program on the operation screen of the software development support unit 11 (S10) and then selects a device of the program selected at S10 (S11). If the user performs an operation to select "Register" on the device selected at S11 (S12), the software development support unit 11 registers the probe of this selected device in order to automatically create a probe list (S13) and outputs the probe list to the sampling display unit 12 (S14). The sampling display unit 12 registers the probe list input from the software development support unit 11 (S15).

As described in the present embodiment, by selecting a control signal or a device on the operation screen of the software development support unit, a probe list can be automatically created. Thus, without referring to a plurality of screens, a control signal or a device to be sampled can be registered by performing a simple operation. Therefore, the production efficiency can be improved.

Second Embodiment

In the first embodiment, a description has been given of a mode in which only one symbol denoting a program is selected; however, the present invention is not limited to this. In the operation screen illustrated in FIG. 3, by performing a drag-and-drop operation, a plurality of symbols F0 and G0 that denote programs are selected, and probe lists can be created automatically and collectively for the symbols F0 and G0 denoting the programs of the selected project. Alternatively, in the operation screen illustrated in FIG. 3, by selecting all the symbols that denote the programs in the selected project, all the probe lists of the selected project can also be created automatically and collectively.

As described in the present embodiment, probe lists can be created automatically and collectively by selecting programs on the operating screen of the software development support unit without referring to a plurality of screens.

Third Embodiment

In the first and second embodiments, a description has been given of a mode in which one or a plurality of symbols denoting programs are selected; however, the present invention is not limited to this. In the present embodiment, with a parameter setting screen being displayed, a parameter necessary for motion control is selected on the parameter setting screen. Then, for the selected parameter, typically, by right-clicking with a mouse, i.e., the input unit 101, on the selected parameter, a menu is displayed. The user selects "Register in digital oscilloscope" from this menu, so that the software development support unit 11 creates a probe list made up of probes of control signals or devices for which the selected parameter is set and outputs the probe list to the sampling display unit 12. The sampling display unit 12 registers the automatically created probe list.

As described in the present embodiment, a probe list can be automatically created by using the parameter setting screen, which is an example of the operation screen of the software development support unit, without referring to a plurality of screens.

Fourth Embodiment

In the first to third embodiments, a description has been given of a mode in which, by selecting a symbol denoting a program, a control signal, or a device, the software development support unit 11 automatically creates a probe list from a probe and outputs the probe list to the sampling display unit 12, which registers the input probe list; however, the present invention is not limited to this. In the present embodiment, a project is selected on a project tree screen displayed in the left screen in FIG. 3 that is a part of the operation screen of the software development support unit, and a symbol denoting a program or a parameter is selected from the selected project. The software development support unit 11 creates a probe list from a probe of the selected symbol denoting a program or selected parameter and outputs the probe list to the sampling display unit 12. The sampling display unit 12 registers the automatically created probe list.

As described in the present embodiment, a probe list can be created automatically and collectively also by selecting one project at a time from the project tree screen, which is a part of the operation screen of the software development support unit, without referring to a plurality of screens.

Fifth Embodiment

Figure 6:
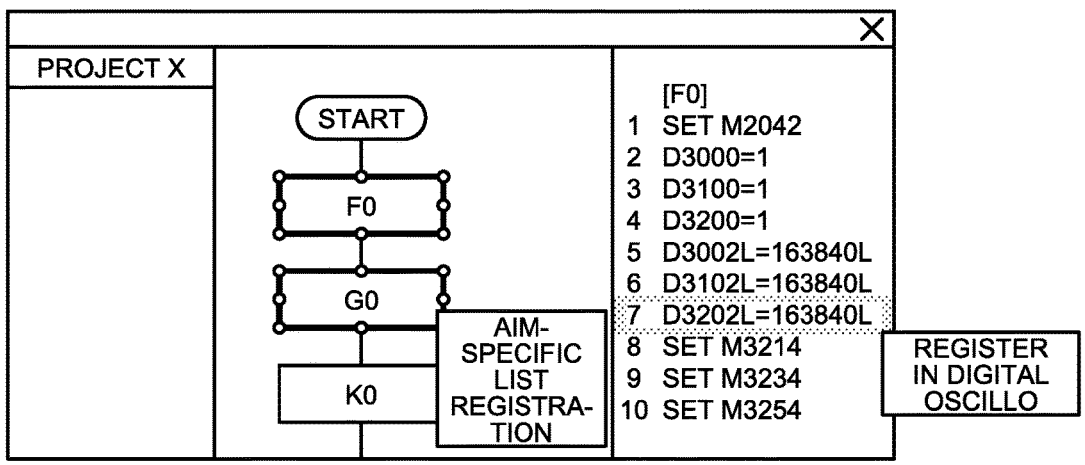
FIG. 6 is a diagram illustrating an example of an operation screen of the software development support unit in a fifth embodiment, the screen being displayed on the display device that is the output unit.

In the first to fourth embodiments, a description has been given of a mode in which a symbol denoting a program, a control signal, a device, or a project is individually selected; however, the present invention is not limited to this. FIG. 6 is a diagram illustrating an example of the operation screen of the software development support unit 11, the screen being displayed on the display device that is the output unit 103. In the operation screen illustrated in FIG. 6, symbols F0, G0, K0 are displayed in the middle. The symbols F0, G0, K0 denote programs that belong to the selected project. Here the symbols F0 and G0 denoting programs are selected. Here, typically, a menu is displayed by right-clicking with a mouse, i.e., the input unit 101, on the selected symbols F0 and G0 denoting programs. Here, the menu only displays the operation of "Aim-specific list registration". When the user selects "Aim-specific list registration", the software development support unit 11 displays an "Aim-specific list registration" screen. FIG. 7 is a diagram illustrating an example of the operation screen of "Aim-specific list registration". When the user enters a list name into the operation screen illustrated in FIG. 7 and presses the digital oscilloscope register button, a probe list is created from probes of programs, control signals, devices, or projects registered in the aim-specific list, and the created probe list is registered. Furthermore, the aim-specific list is registered in the storage unit 102. The user recalls the aim-specific list as needed and has the software development support unit 11 automatically create a probe list, and the sampling display unit 12 then automatically registers this probe list.

As such, when objects to form a probe list are grouped as an aim-specific list, the probe list can be re-registered by performing one simple operation collectively for all the objects.

Figure 8:
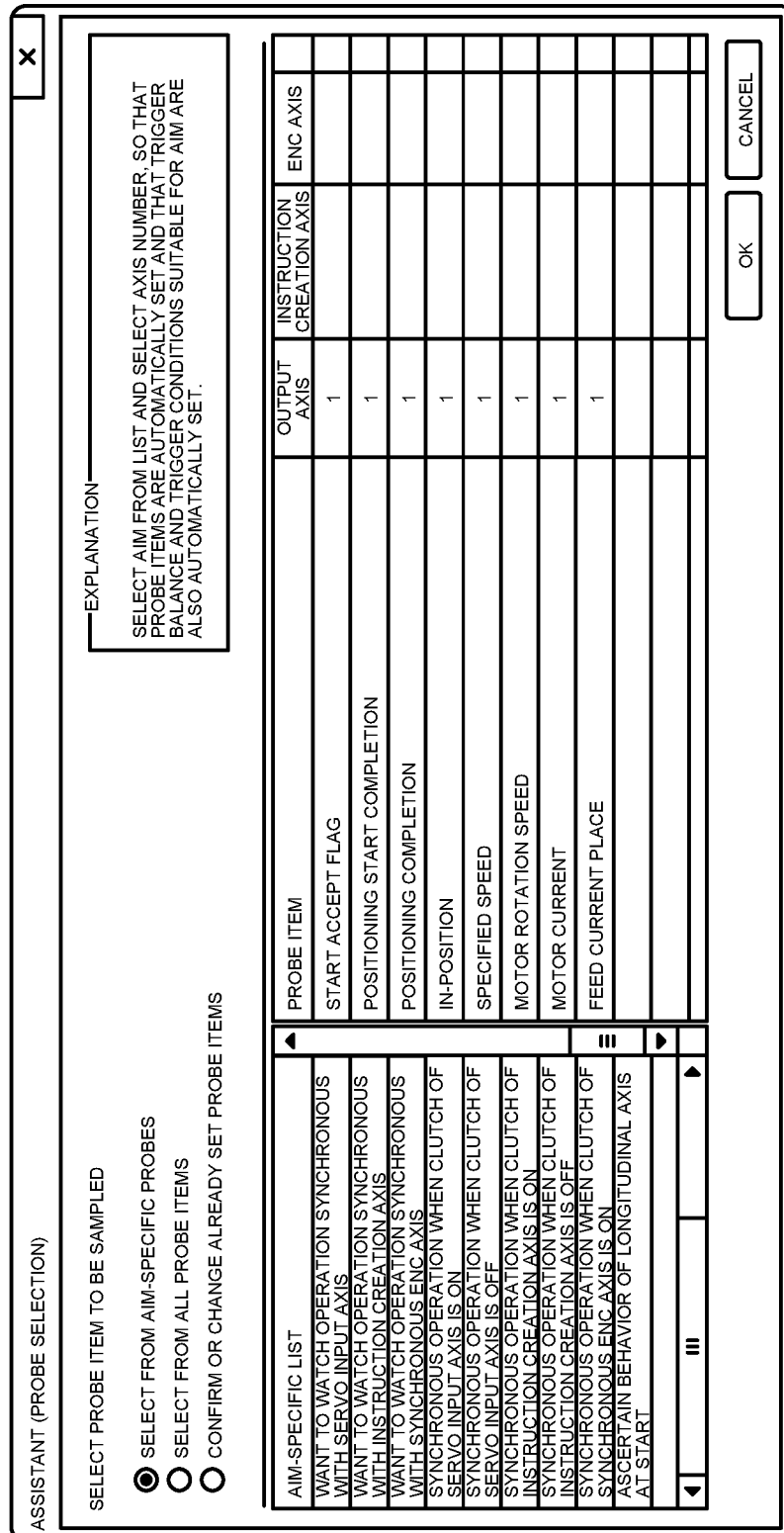
FIG. 8 is a diagram illustrating an example where an aim-specific list is processed into library data in the fifth embodiment.

If the aim-specific list described in the present embodiment is processed into library data and saved, the aim-specific list can be made distributable. FIG. 8 is a diagram illustrating an example where an aim-specific list has been processed into library data. If grouped objects are converted into library data to be distributable, this aim-specific list can be used in another terminal as well, which means that a probe list to be used in another terminal can be created collectively for all the objects by performing one simple operation.

The configurations shown in the above embodiments shows examples of the content of the present invention and can be combined with other publicly known techniques, and parts of each of the configurations can be omitted or changed without departing from the spirit of the invention.

REFERENCE SIGNS LIST 10 positioning control apparatus, 11 software development support unit, 12 sampling display unit, 13 controller, 20 servo amplifier, 30 motor, 101 input unit, 102 storage unit, 103 output unit, 104 processing unit, 105 control unit, 106 computing unit.

The invention claimed is:

1. A positioning control apparatus that controls driving of a motor while displaying a motion control program, the positioning control apparatus comprising:
a software development supporter to select a program among a plurality of programs displayed on an operation screen of the motion according to a first user input; select, according to a second user input, a device or a control signal to which the selected program is to be applied, and create a probe list based on the selected program and the selected device or the selected control signal; and
a sampling display to output the probe list to a controller and to display data sampled by using the controller, wherein
the software development supporter outputs the probe list to the sampling display, and the sampling display registers the probe list from the software development supporter.

2. The positioning control apparatus according to claim 1, wherein
the software development supporter creates the probe list per project.

3. The positioning control apparatus according to claim 1, wherein objects to form the probe list are grouped as an aim-specific list.

4. The positioning control apparatus according to claim 3, wherein the objects to form the probe list, which are grouped as the aim-specific list, are converted into library data so as to be able to be used in another terminal.

* * * * *